(12) United States Patent
Ogatsu et al.

(10) Patent No.: US 10,176,597 B2
(45) Date of Patent: Jan. 8, 2019

(54) CHANGE DEGREE DERIVING APPARATUS, CHANGE DEGREE DERIVING METHOD, AND NON-TRANSITORY COMPUTER READABLE MEDIUM

(71) Applicant: FUJI XEROX CO., LTD., Tokyo (JP)

(72) Inventors: Hitoshi Ogatsu, Kanagawa (JP); Shinji Sasahara, Kanagawa (JP); Junichi Matsunoshita, Kanagawa (JP); Ken Ogino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/336,109

(22) Filed: Oct. 27, 2016

(65) Prior Publication Data
US 2017/0330347 A1 Nov. 16, 2017

(30) Foreign Application Priority Data
May 11, 2016 (JP) .................. 2016-095126

(51) Int. Cl.
*G06K 9/00* (2006.01)
*G06T 7/90* (2017.01)
*G06K 9/46* (2006.01)

(52) U.S. Cl.
CPC .............. *G06T 7/90* (2017.01); *G06K 9/4652* (2013.01); *G06T 2207/10024* (2013.01)

(58) Field of Classification Search
None
See application file for complete search history.

(56) References Cited

U.S. PATENT DOCUMENTS

| 9,253,460 | B1* | 2/2016 | Wang | ............... H04N 9/735 |
| 2013/0050544 | A1* | 2/2013 | Kano | ............... H04N 9/045 348/242 |
| 2014/0185927 | A1* | 7/2014 | Kawabata | ............ G01J 3/50 382/162 |

FOREIGN PATENT DOCUMENTS

JP 2014-196926 A 10/2014

* cited by examiner

*Primary Examiner* — Stephen P Coleman
(74) *Attorney, Agent, or Firm* — Oliff PLC

(57) ABSTRACT

A change degree deriving apparatus includes a receiving unit and a change acquiring unit. The receiving unit receives image data and new product image data. The image data is obtained by capturing an object, through/from which a light source having a known spectral characteristic is transmitted/reflected, under a condition with no influence of sunlight. The new product image data is obtained by capturing the object in a new product state under an identical condition. The change acquiring unit acquires a change degree of the object by comparing a ratio of first data on a first specific color to second data on a second specific color that is different from the first specific color in relation to the received image data, with a ratio of third data on the first specific color to fourth data on the second specific color in relation to the received new product image data.

5 Claims, 6 Drawing Sheets

US 10,176,597 B2

CHANGE DEGREE DERIVING APPARATUS, CHANGE DEGREE DERIVING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-095126 filed May 11, 2016.

BACKGROUND

Technical Field

The present invention relates to a change degree deriving apparatus, a change degree deriving method, and a non-transitory computer readable medium.

SUMMARY

According to an aspect of the invention, a change degree deriving apparatus includes a receiving unit and a change acquiring unit. The receiving unit is configured to receive image data and new product image data. The image data is obtained by capturing an object, through or from which a light source having a known spectral characteristic is transmitted or reflected, under a condition with no influence of sunlight. The new product image data is obtained by capturing the object in a new product state under an identical condition. The change acquiring unit is configured to acquire a change degree of the object by comparing a ratio of first data on a first specific color to second data on a second specific color that is different from the first specific color in relation to the image data received by the receiving unit, with a ratio of third data on the first specific color to fourth data on the second specific color in relation to the new product image data received by the receiving unit.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described in detail with reference to drawings.

Figure 1:
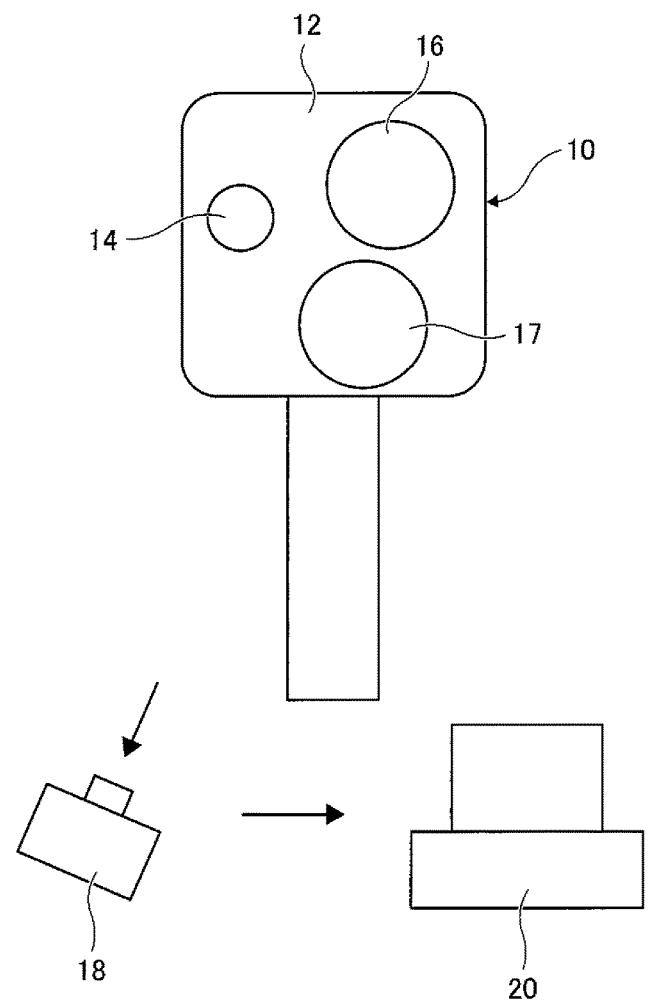
FIG. 1 is a diagram illustrating a deterioration measuring system according to an exemplary embodiment of the present invention.

FIG. 1 is a diagram illustrating a deterioration measuring system according to an exemplary embodiment of the present invention.

An object 10 for which a deterioration measurement is to be performed is, for example, a signboard, and is provided at a place where a direct measurement is difficult (such as a high place). The object 10 includes, for example, a translucent body and includes, for example, a white portion 12, a red portion 14, a green portion 16, and a blue portion 17. A light source such as a fluorescent lamp or a white LED is disposed in the object 10, and light emitted from the light source is adapted to transmit through the object 10. As described below, a spectral characteristic of the light emitted from the light source is measured in advance.

An image capturing apparatus 18 may be a digital camera, a smartphone, a tablet PC, or the like. A deterioration measurement target is image data which is obtained by the image capturing apparatus 18 capturing only the light emitted from the light source of the object 10 transmits through the object 10 at night (i.e., under a condition with no influence of sunlight). The image capturing apparatus 18 extracts the object 10 from the captured image data.

A deterioration measuring apparatus 20, which is, for example, a personal computer, is configured to receive the image data obtained by capturing the object 10 using the image capturing apparatus 18, and process the image data.

Figure 2:
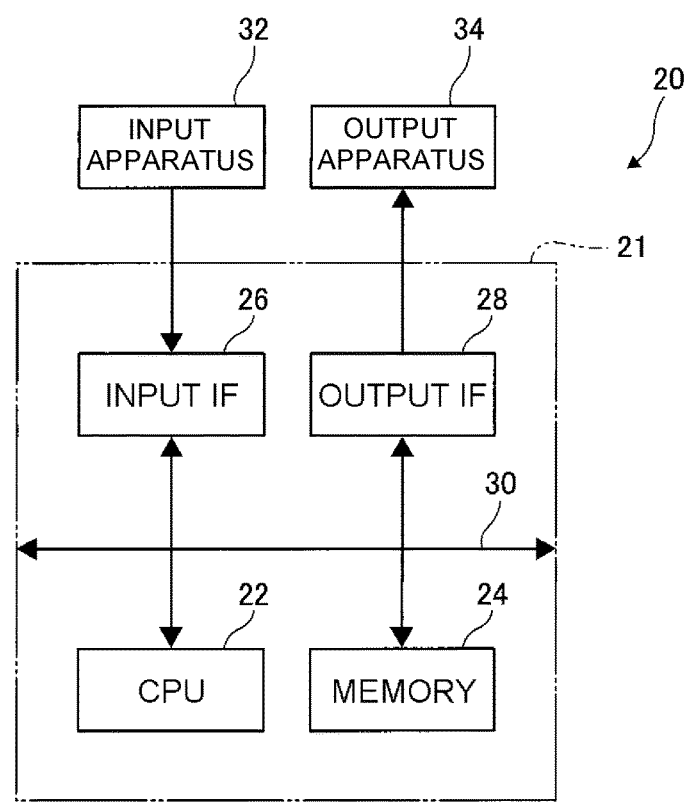
FIG. 2 is a block diagram illustrating hardware of a deterioration measuring apparatus according to the exemplary embodiment of the present invention.

FIG. 2 is a block diagram illustrating the deterioration measuring apparatus 20.

The deterioration measuring apparatus 20 includes a CPU 22, a memory 24, an input interface 26, and an output interface 28, which are connected through a control bus 30.

The CPU 22 executes a predetermined processing based on a control program stored in the memory 24. An input apparatus 32 is connected to the input interface 26. Examples of the input apparatus 32 include a connector that is directly connected to the above described image capturing apparatus 18 for input and an apparatus that inputs in a wireless manner through a communication. Also, an output apparatus 34 is connected to the output interface 28. The output apparatus 34 is a display or a printer, through which a result such as processed data is output.

Hereinafter, descriptions will be made on a deterioration measuring method of the object 10 using the deterioration measuring apparatus 20.

First, the premise will be described. The object 10 is captured by the image capturing apparatus 18 under the condition with no influence of sunlight. The object 10 may be captured after moved to a darkroom or the like, or may be captured at night. This is because an influence by other light is reduced at night. Also, the image capturing apparatus 18 has an automatic exposure adjustment (AE) function for obtaining a proper exposure amount so that whites are not clipped and blacks are not crushed. Also, it has an auto white balance (AWB) function so that a white color is captured in white even in lighting conditions having different color temperatures such as a bulb, a fluorescent lamp, a natural light and the like. The AWB is a manipulation that changes a ratio of RGB of the captured image. Therefore, in the exemplary embodiment, it is preferable that the AE works, but the AWB is turned OFF so as not to work.

Figure 6A:
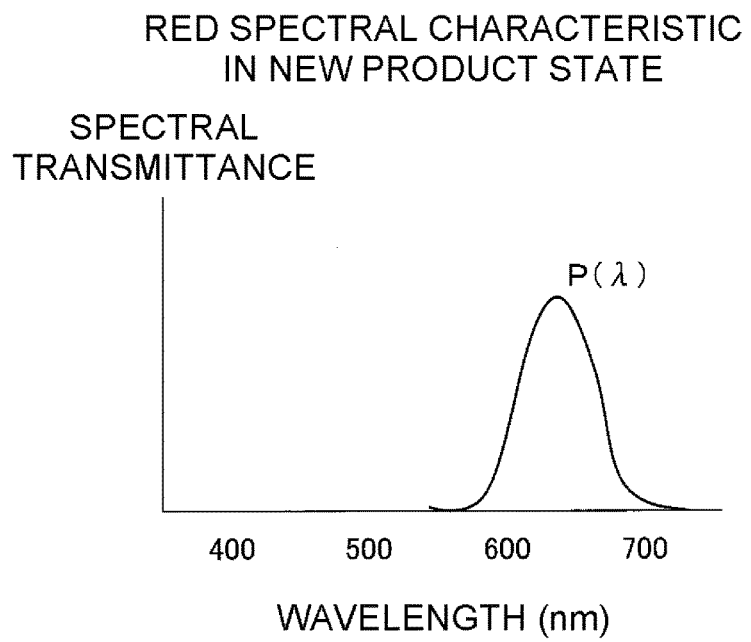
FIG. 6A is a characteristic diagram illustrating a red spectral characteristic in the new product state in the exemplary embodiment of the present invention.
Figure 6B:
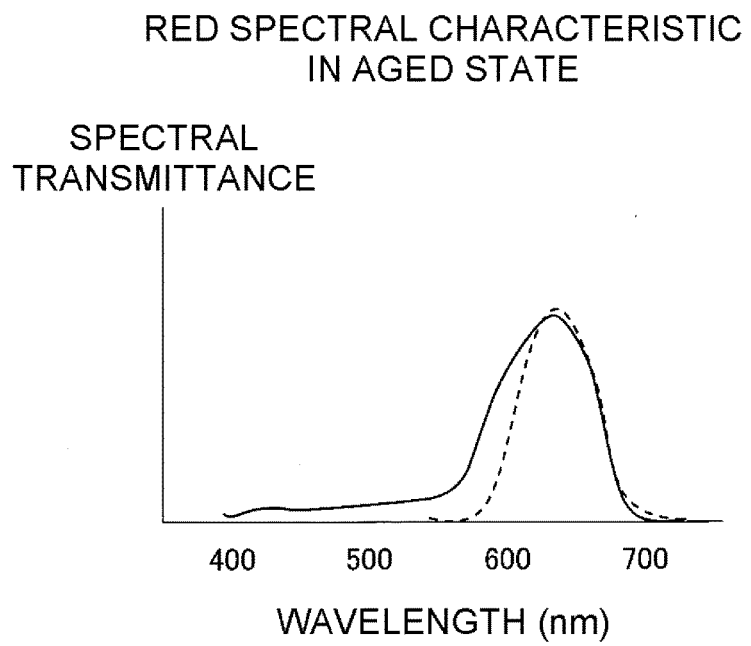
FIG. 6B is a characteristic diagram illustrating a red spectral characteristic in the aged state.

Generally speaking, a Y (yellow) component in red color changes over time and disappears primarily due to ultraviolet rays, and thus absorption on a short wavelength side (B side) is reduced. As a result, values of unnecessary absorption components (G, B) with respect to the red color are increased. In the exemplary embodiment, for example, the red component in a new product state (shown in FIG. 6A) changes in a spectral characteristic over time as illustrated in FIG. 6B. In this manner, the exemplary embodiment measures a deterioration of the object 10 using a change of a spectral characteristic of a specific color (e.g., red).

Figure 5:
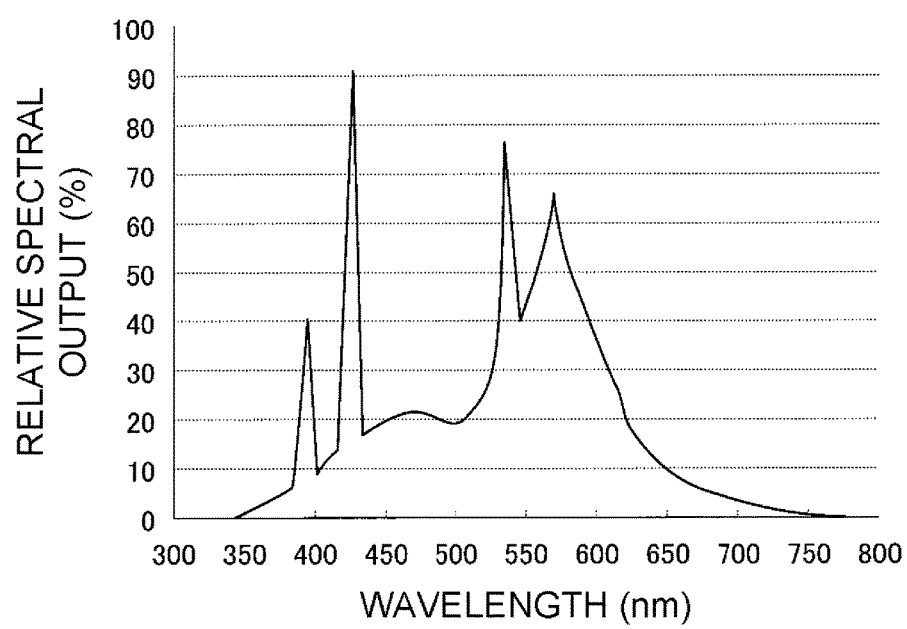
FIG. 5 is a characteristic diagram illustrating a spectral characteristic of a light source of an object used in the exemplary embodiment of the present invention.

Here, a spectral characteristic $S(\lambda)$ of a light source is expressed in, for example, FIG. 5. Then, RGB information that are pixel values captured by a camera are values obtained by integrating the product of spectral characteristics of the light source, the object, and an RGB color separation filter of the camera as expressed in Equations (1), (2), and (3). Here, $S(\lambda)$ represents a spectral characteristic of the light source, $P(\lambda)$ represents a spectral characteristic of the object, and $C(\lambda)$ represents a spectral characteristic of an RGB color separation filter included in the image capturing apparatus.

[Equation 1]

$$R_{new} = \int \int_{380}^{780} S(\lambda) \cdot P(\lambda) \cdot Cr(\lambda) \cdot d\lambda \quad (1)$$

[Equation 2]

$$G_{new} = \int \int_{380}^{780} S(\lambda) \cdot P(\lambda) \cdot Cg(\lambda) \cdot d\lambda \quad (2)$$

[Equation 3]

$$B_{new} = \int \int_{380}^{780} S(\lambda) \cdot P(\lambda) \cdot Cb(\lambda) \cdot d\lambda \quad (3)$$

Figure 3:
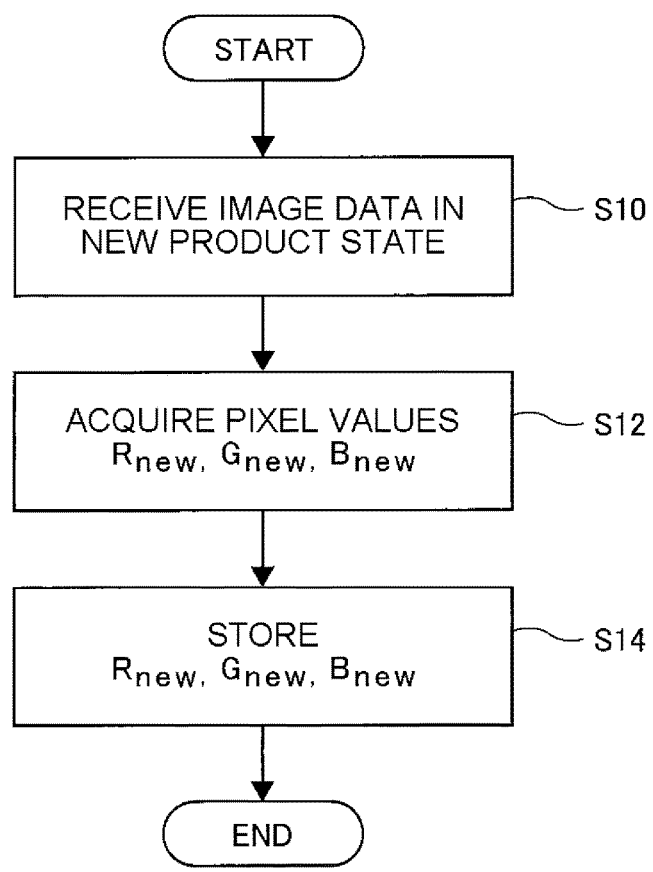
FIG. 3 is a flowchart illustrating a processing flow for a new product state by the deterioration measuring apparatus according to the exemplary embodiment of the present invention.

FIG. 3 is a flowchart illustrating a processing flow for a new product state by the deterioration measuring apparatus 20.

First, in step S10, image data of the object 10 captured by the image capturing apparatus 18 is received.

In the following step S12, pixel values ($R_{new}$, $G_{new}$, $B_{new}$) of the object 10 are acquired from the image data received in step S10.

In the following step S14, the pixel values ($R_{new}$, $G_{new}$, $B_{new}$) calculated in step S12 are stored in the memory 24, and then the process is ended.

Figure 4:
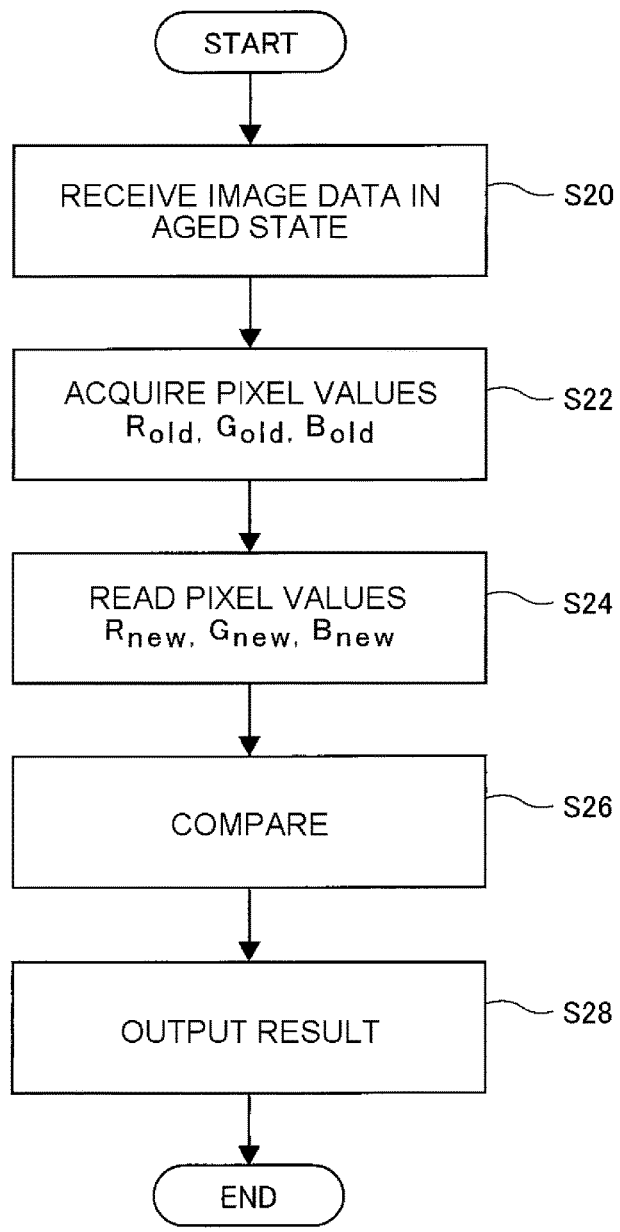
FIG. 4 is a flowchart illustrating a processing flow for an aged state by the deterioration measuring apparatus according to the exemplary embodiment of the present invention.

FIG. 4 is a flowchart illustrating a processing flow for an aged state by the deterioration measuring apparatus 20.

First, in step S20, image data of the object 10 in the aged state is received.

In the following step S22, pixel values ($R_{old}$, $G_{old}$, $B_{old}$) of the object 10 are acquired.

In the following step S24, the pixel values ($R_{new}$, $G_{new}$, $B_{new}$) stored in the memory 24 are read.

In the following step S26, a comparison is performed based on the pixel values ($R_{old}$, $G_{old}$, $B_{old}$) calculated in step S22 and the pixel values ($R_{new}$, $G_{new}$, $B_{new}$) read in step S24.

That is, in a case of a red color, $B_{new}/R_{new}$ is compared with $B_{old}/R_{old}$. In a case of a green color, $B_{new}/G_{new}$ is compared with $B_{old}/G_{old}$. As a difference between the two gets larger, it may be determined that the deterioration has been more progressed.

Meanwhile, the ratio in the new product state, that is, $B_{new}/R_{new}$ or $B_{new}/G_{new}$ may be calculated and stored in the new product state.

Then, in the following step S28, the measurement result is output to the output apparatus 34 and then the process is ended. As the measurement result, the data obtained through the comparison in step S26 may be output as it is. When the measurement result exceeds a threshold, a message indicating that repairing is needed may be displayed, or a deterioration level, e.g., level 1, level 2 or the like may be output.

Meanwhile, in the exemplary embodiment, the light emitted from the light source is allowed to transmit through the object 10, but may be allowed to reflect on the object 10. In such a case, a deterioration measurement of an object is performed based on a spectral characteristic of the reflected light.

Also, in the exemplary embodiment, the deterioration measuring apparatus 20 is configured as a personal computer, but the present invention is not limited thereto. For example, the image capturing apparatus 18 may have all or a part of functions of the deterioration measuring apparatus 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A change degree deriving apparatus for measuring the deterioration of an object located in a place where a direct measurement of deterioration is difficult, the change degree deriving apparatus comprising:
  a receiving unit configured to receive image data and new product image data representing images of the object captured at different times, wherein
  the new product image data is obtained by capturing the object in a new product state, through or from which a light source having a known spectral characteristic is transmitted or reflected, under a condition with no influence of sunlight, and
  the image data is obtained by capturing the object under an identical condition at a later time than a time at which the new product image data is obtained;
  a change acquiring unit configured to acquire a change degree of the object by comparing a ratio of first data on a first specific color to second data on a second specific color that is different from the first specific color in relation to the image data received by the receiving unit, with a ratio of third data on the first specific color to fourth data on the second specific color in relation to the new product image data received by the receiving unit; and
  an output unit configured to output the change degree of the object acquired by the change acquiring unit, so as to provide a user of the apparatus a measurement of the amount of deterioration of the object.

2. The change degree deriving apparatus according to claim 1, wherein the first specific color is red, and the second specific color is blue.

3. The change degree deriving apparatus according to claim 1, wherein the first specific color is green, and the second specific color is blue.

4. A change degree deriving method for measuring the deterioration of an object located in a place where a direct measurement of deterioration is difficult, the method comprising:

receiving image data and new product image data representing images of the object captured at different times, wherein the new product image data is obtained by capturing the object in a new product state, through or from which a light source having a known spectral characteristic is transmitted or reflected, under a condition with no influence of sunlight, and the image data is obtained by capturing the object under an identical condition at a later time than a time at which the new product image data is obtained;

acquiring a change degree of the object by comparing a ratio of first data on a first specific color to second data on a second specific color that is different from the first specific color in relation to the received image data, with a ratio of third data on the first specific color to fourth data on the second specific color in relation to the received new product image data; and outputting the change degree of the object acquired by the change acquiring unit, so as to provide a user with a measurement of the amount of deterioration of the object.

5. A non-transitory computer readable medium storing a program that causes a computer to execute a change degree deriving process for measuring the deterioration of an object located in a place where a direct measurement of deterioration is difficult, the process comprising:

receiving image data and new product image data representing images of an object captured at different times, wherein the new product image data is obtained by capturing the object in a new product state, through or from which a light source having a known spectral characteristic is transmitted or reflected, under a condition with no influence of sunlight, and the image data is obtained by capturing the object under an identical condition at a later time than a time at which the new product image data is obtained; and acquiring a change degree of the object by comparing a ratio of first data on a first specific color to second data on a second specific color that is different from the first specific color in relation to the received image data, with a ratio of third data on the first specific color to fourth data on the second specific color in relation to the received new product image data: and outputting the change degree of the object acquired by the change acquiring unit, so as to provide a user with a measurement of the amount of deterioration of the object.

* * * * *